US010466798B2

(12) United States Patent
Jiang et al.

(10) Patent No.: US 10,466,798 B2
(45) Date of Patent: Nov. 5, 2019

(54) SYSTEM AND METHOD FOR INPUTTING GESTURES IN 3D SCENE

(71) Applicant: Qingdao GoerTek Technology Co.,Ltd., Qingdao (CN)

(72) Inventors: Maoshan Jiang, Qingdao (CN); Xiangjun Zhang, Qingdao (CN); Hongwei Zhou, Qingdao (CN)

(73) Assignee: Qingdao GoerTek Technology Co., Ltd., Qingdao (CN)

(*) Notice: Subject to any disclaimer, the term of this patent is extended or adjusted under 35 U.S.C. 154(b) by 469 days.

(21) Appl. No.: 15/313,472

(22) PCT Filed: Sep. 24, 2015

(86) PCT No.: PCT/CN2015/090531
§ 371 (c)(1),
(2) Date: Nov. 22, 2016

(87) PCT Pub. No.: WO2016/107231
PCT Pub. Date: Jul. 7, 2016

(65) Prior Publication Data
US 2017/0192519 A1    Jul. 6, 2017

(30) Foreign Application Priority Data
Dec. 30, 2014  (CN) .......................... 2014 1 0842158

(51) Int. Cl.
*G06F 3/01*      (2006.01)
*G06T 7/292*     (2017.01)
(Continued)

(52) U.S. Cl.
CPC ............ *G06F 3/017* (2013.01); *G06F 3/0325* (2013.01); *G06T 7/246* (2017.01); *G06T 7/292* (2017.01);
(Continued)

(58) Field of Classification Search
CPC ........ G06F 3/017; G06F 1/1686; G06F 3/005; G06F 3/0425; A63F 2300/1087;
(Continued)

(56) References Cited

U.S. PATENT DOCUMENTS

2012/0229509 A1    9/2012   Liu
2012/0309532 A1   12/2012   Ambrus et al.
(Continued)

FOREIGN PATENT DOCUMENTS

CN    1648840 A    8/2005
CN    1747559 A    3/2006
(Continued)

OTHER PUBLICATIONS

International Search Report dated Jan. 12, 2016 for PCT Application No. PCT/CN2015/090531.
(Continued)

*Primary Examiner* — Haixia Du
(74) *Attorney, Agent, or Firm* — Moser Taboada

(57) ABSTRACT

The present disclosure discloses a system and a method for inputting a gesture in a 3D scene. The system comprises a gesture acquiring unit configured to simultaneously acquire at least two channels of video stream data in real time at different angles for a user's gesture; a gesture recognizing unit configured to recognize a gesture shape varying in real time from the at least two channels of video stream data; a gesture analyzing unit configured to analyze the gesture shape varying in real time to obtain corresponding gesture motion; and a gesture displaying unit configured to process the gesture motion into a 3D image and display the 3D image in the 3D scene in real time. The technical solutions of the present disclosure can display the user's real gesture in the 3D scene, thereby enhancing the real effect of the system and improving the user's usage experience.

6 Claims, 3 Drawing Sheets

(51) Int. Cl.
    *G06F 3/03* (2006.01)
    *G06T 7/246* (2017.01)
(52) U.S. Cl.
    CPC .... *G06F 3/011* (2013.01); *G06T 2207/30196* (2013.01)
(58) Field of Classification Search
    CPC .......... G08C 2201/32; G06K 9/00355; G06K 9/00335; H04M 2250/05
    See application file for complete search history.

(56) References Cited

U.S. PATENT DOCUMENTS

| | | | |
|---|---|---|---|
| 2013/0207998 A1 | 8/2013 | Aoki | |
| 2013/0278503 A1 | 10/2013 | Hirata | |
| 2014/0125584 A1 | 5/2014 | Xun et al. | |
| 2015/0029092 A1* | 1/2015 | Holz | G06F 3/017 345/156 |
| 2015/0379770 A1* | 12/2015 | Haley, Jr. | G02B 27/0172 345/633 |

FOREIGN PATENT DOCUMENTS

| | | |
|---|---|---|
| CN | 102156859 A | 8/2011 |
| CN | 102184021 A | 9/2011 |
| CN | 102681651 A | 9/2012 |
| CN | 102722249 A | 10/2012 |
| CN | 103914152 A | 7/2014 |
| CN | 103927016 A | 7/2014 |
| CN | 104050859 A | 9/2014 |
| CN | 104571510 A | 4/2015 |
| CN | 104571510 A | 4/2015 |
| CN | 204463032 U | 7/2015 |
| CN | 204463032 U | 7/2015 |
| JP | 2012137989 A | 7/2012 |
| JP | 2013164658 A | 8/2013 |
| JP | 2014524070 A | 9/2014 |

OTHER PUBLICATIONS

Japanese Office Action dated Aug. 29, 2014 for Application No. 2017-509021.
China Patent Application No. 201410842158.3 First Office Action dated Mar. 23, 2017.
China Patent Application No. 201410842158.3 Second Office Action dated Sep. 22, 2017.
Written Opinion of the International Searching Authority dated Jan. 12, 2016 for PCT Application No. PCT/CN2015/090531.

* cited by examiner

SYSTEM AND METHOD FOR INPUTTING GESTURES IN 3D SCENE

TECHNICAL FIELD

The present disclosure relates to the technical field of virtual reality, and particularly, to a system and a method for inputting a gesture in a 3D scene.

BACKGROUND

In the future, the virtual reality technology will become a new breakthrough for changing people's life style. Currently, how the virtual reality technology interacts with a target in the virtual world is a great challenge to the virtual reality technology, and thus there is still a long way for the virtual reality technology to really enter the consumer market.

Currently, various existing virtual reality equipments still obstruct the communications between the user and the virtual world, and in 3D scenes, relevant parts of a human body cannot be tracked, e.g., the user's hand motion cannot be really simulated at present.

SUMMARY

The present disclosure provides a system and a method for inputting a gesture in a 3D scene, so as to solve the problem in the prior art that the user's hand motion cannot be really simulated in 3D scenes.

In order to achieve the above objective, the technical solutions of the present disclosure are realized as follows:

In one aspect, the present disclosure provides a system for inputting a gesture in a 3D scene, comprising:

a gesture acquiring unit configured to simultaneously acquire at least two channels of video stream data in real time at different angles for a user's gesture;

a gesture recognizing unit configured to recognize a gesture shape varying in real time from the at least two channels of video stream data;

a gesture analyzing unit configured to analyze the gesture shape varying in real time to obtain corresponding gesture motion; and a gesture displaying unit configured to process the gesture motion into a 3D image and display the 3D image in the 3D scene in real time.

Preferably, the system further comprises:

a gesture operating unit configured to obtain, from a preset semantic database, a gesture semantics of the gesture motion and an operation instruction corresponding to the gesture semantics; and send the operation instruction corresponding to the gesture semantics to the 3D scene, so that the 3D scene performs an operation of the gesture semantics.

Preferably, the gesture recognizing unit comprises:

a sampling module configured to perform a sampling processing of each of the at least two channels of video stream data to obtain video image data sampled each time;

a gesture contour extracting module configured to judge whether the video image data contain hand information, and if so, perform a binarization processing of the video image data to extract hand contour information;

a gesture shape recognizing module configured to recognize a gesture shape corresponding to the hand contour information from a preset gesture model database; and a gesture shape synthesizing module configured to synthesize gesture shapes recognized after each sampling of the respective channels of video stream data to obtain a gesture shape varying in real time.

Preferably, the gesture analyzing unit comprises:

a position information obtaining module configured to obtain relative spatial position information of the gesture shape varying in real time;

a contact information obtaining module configured to obtain variation information of a determined contact on the gesture shape varying in real time, according to the contact on the gesture shape varying in real time, wherein the contact is a characteristic key point for identifying a hand; and a gesture motion obtaining module configured to obtain corresponding gesture motion from a preset motion database, according to the relative spatial position information and the variation information of the contact.

More preferably, the position information obtaining module is specifically configured to:

obtain angle information with the gesture shape varied, from video image information of the at least two channels of video data streams;

obtain distance information of the user's gesture according to the angle information with the gesture shape varied, or sense distance information of the user's gesture in real time through a distance sensor; and obtain the relative spatial position information of the user's gesture according to the angle information with the gesture shape varied and the distance information of the user's gesture.

In another aspect, the present disclosure provides a method for inputting a gesture in a 3D scene, comprising:

simultaneously acquiring at least two channels of video stream data in real time at different angles for a user's gesture;

recognizing a gesture shape varying in real time from the at least two channels of video stream data;

analyzing the gesture shape varying in real time to obtain corresponding gesture motion; and processing the gesture motion into a 3D image and displaying the 3D image in the 3D scene in real time.

Preferably, the method further comprises:

obtaining, from a preset semantic database, a gesture semantics of the gesture motion and an operation instruction corresponding to the gesture semantics; and sending the operation instruction corresponding to the gesture semantics to the 3D scene, so that the 3D scene performs an operation of the gesture semantics.

Preferably, the recognizing a gesture shape varying in real time from the at least two channels of video stream data comprises:

performing a sampling processing of each of the at least two channels of video stream data to obtain video image data sampled each time;

judging whether the video image data contain hand information, and if so, performing a binarization processing of the video image data to extract hand contour information;

recognizing a gesture shape corresponding to the hand contour information from a preset gesture model database; and synthesizing gesture shapes recognized after each sampling of the respective channels of video stream data to obtain a gesture shape varying in real time.

Preferably, the analyzing the gesture shape varying in real time to obtain corresponding gesture motion comprises:

obtaining relative spatial position information of the gesture shape varying in real time;

obtaining variation information of a determined contact on the gesture shape varying in real time, according to the contact on the gesture shape varying in real time, wherein the contact is a characteristic key point for identifying a hand; and obtaining corresponding gesture motion from a preset motion database, according to the relative spatial position information and the variation information of the contact.

More preferably, the obtaining relative spatial position information of the gesture shape varying in real time comprises:

obtaining angle information with the gesture shape varied, from video image information of the at least two channels of video data streams;

obtaining distance information of the user's gesture according to the angle information with the gesture shape varied, or sensing distance information of the user's gesture in real time through a distance sensor; and obtaining the relative spatial position information of the user's gesture according to the angle information with the gesture shape varied and the distance information of the user's gesture.

The embodiments of the present disclosure have the following beneficial effect: the embodiments of the present disclosure disclose a system and method for inputting a gesture in a 3D scene. In the system, the gesture acquiring unit simultaneously acquires at least two channels of video stream data in real time for a user's gesture at different angles; the gesture recognizing unit recognizes a gesture shape having complete hand information from the at least two channels of video stream data; the gesture analyzing unit analyzes the gesture shape to obtain corresponding gesture motion; and the gesture displaying unit processes the gesture motion into a 3D image and display the 3D image in the 3D scene in real time, thereby achieving the purpose of displaying the user's real gesture in the 3D scene.

In addition, a preferred technical solution of the present disclosure further processes the gesture motion by the gesture operating unit to generate corresponding gesture semantics, so that the 3D scene performs an operation corresponding to the gesture semantics, thereby achieving the purpose of controlling the 3D scene through the input gesture. As compared with the prior art, the technical solution interacts with the virtual reality device without a keyboard or a mouse, and the interaction process does not need to make too much constraint to the user and the use environment, i.e., the user does not need to wear any recognition mark or sensor on his body, thereby realizing the interaction between the user and the 3D scene through the user's real gesture, and improving the user's usage experience.

BRIEF DESCRIPTION OF THE DRAWINGS

The drawings are provided for a further understanding of the present disclosure, and constitute part of the Specification. The drawings are used together with the embodiments of the present disclosure to explain the present disclosure, rather than making any limitation to the present disclosure, in which.

DETAILED DESCRIPTION

In order that the objective, technical solutions and advantages of the present disclosure are clearer, the embodiments of the present disclosure will be further described in details as follows with reference to the drawings.

The whole idea of the present disclosure is to acquire the user's gesture in real time at different angles using at least two cameras, recognize the shape of the user's gesture according to the video stream data acquired by each camera, analyze the recognized gesture shape to obtain corresponding gesture motion, process the gesture motion into a 3D image and display the 3D image in the 3D scene in real time, and cause the 3D scene to perform an operation of the gesture motion, so as to complete a man-machine interaction through the user's real gesture.

Figure 1:
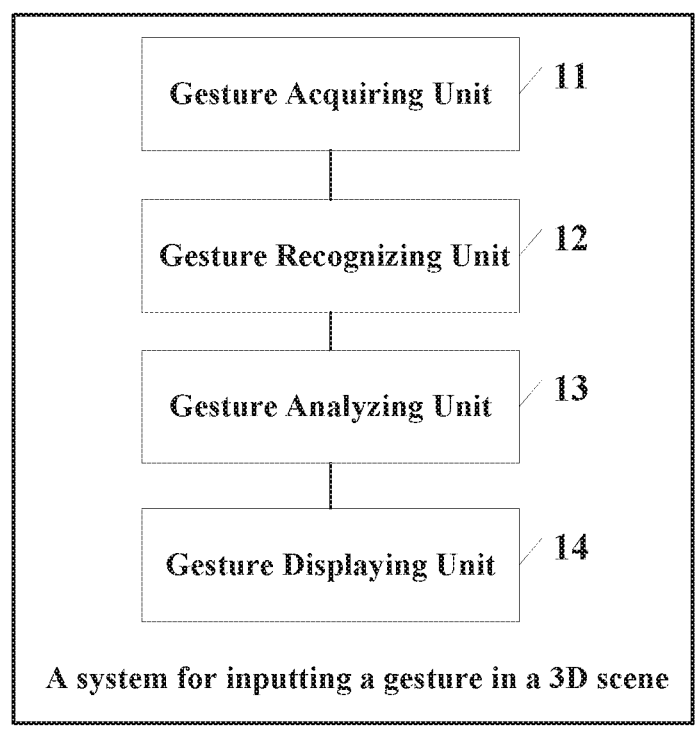
FIG. 1 is a structure diagram of a system for inputting a gesture in a 3D scene provided by an embodiment of the present disclosure.

FIG. 1 is a structure diagram of a system for inputting a gesture in a 3D scene provided by an embodiment of the present disclosure. The system comprises a gesture acquiring unit 11, a gesture recognizing unit 12, a gesture analyzing unit 13 and a gesture displaying unit 14.

The gesture acquiring unit 11 is configured to simultaneously acquire at least two channels of video stream data in real time at different angles for a user's gesture.

In that, the gesture acquiring unit 11 can acquire the user's gesture in real time at different angles through a plurality of cameras, so as to obtain a plurality of channels of video stream data. In practical application, an appropriate amount of cameras may be selected to acquire corresponding number of channels of video stream data, according to the system data processing capacity and the system accuracy requirement. To be noted, the camera in the gesture acquiring unit 11 may be a white light camera of common performances, or an infrared camera, and the gesture acquiring unit is not particularly limited in this embodiment.

The gesture recognizing unit 12 is configured to recognize a gesture shape varying in real time from the at least two channels of video stream data.

The gesture analyzing unit 13 is configured to analyze the gesture shape varying in real time to obtain corresponding gesture motion.

The gesture displaying unit 14 is configured to process the gesture motion into a 3D image and display the 3D image in the 3D scene in real time.

The gesture displaying unit 14 in the present disclosure may process the gesture motion into a 3D image and superposition-project the 3D image into the 3D scene to achieve a real-time display of the gesture motion in the 3D scene. Preferably, a screen splitting technology may be adopted to project the 3D image into the 3D scene, i.e., the 3D scene is displayed on a main display screen, and the gesture motion processed into the 3D image is displayed on another display screen, so that a 3D scene containing the gesture motion is presented to the human eyes through relevant optical principles.

Preferably, the system further comprises a gesture operating unit configured to obtain, from a preset semantic database, a gesture semantics of the gesture motion and an operation instruction corresponding to the gesture semantics; and send the operation instruction corresponding to the gesture semantics to the 3D scene, so that the 3D scene performs an operation of the gesture semantics.

In that, the semantic database may be a data relation table, wherein each gesture motion corresponds to one gesture semantics and an operation instruction corresponding to the gesture semantics. For example, a gesture motion of translation may be defined as sliding the screen to switch the displayed contents.

In this embodiment, the gesture acquiring unit acquires at least two channels of video stream data in real time for the user's gesture; the gesture recognizing unit recognizes a gesture shape having complete hand information from the at least two channels of video stream data; the gesture analyzing unit analyzes the gesture shape to obtain corresponding gesture motion; and the gesture displaying unit processes the gesture motion into a 3D image and display the 3D image in the 3D scene in real time, so as to achieve the purpose of displaying the user's real gesture in the 3D scene.

In addition, a preferred embodiment further processes the gesture motion by the gesture operating unit to generate corresponding gesture semantics, so that the 3D scene performs an operation of the gesture semantics to achieve the purpose of controlling the 3D scene through the input gesture. As compared with the prior art, the technical solution interacts with the virtual reality device without a keyboard or a mouse, and the interaction process does not need to make too much constraint to the user and the use environment, while the user also does not need to wear any recognition mark or sensor on his body.

Preferably, the gesture recognizing unit 12 in the embodiment as illustrated in FIG. 1 comprises a sampling module, a gesture contour extracting module, a gesture shape recognizing module and a gesture shape synthesizing module.

The sampling module is configured to perform a sampling processing of each of the at least two channels of video stream data to obtain video image data sampled each time.

The gesture contour extracting module is configured to judge whether the video image data contain hand information, and if so, performing a binarization processing of the video image data to extract hand contour information.

To be noted, the gesture contour extracting module in this embodiment can judge whether the video image data contain hand information through the existing technology. For example, it may judge whether a video image contains hand information by analyzing whether a characteristic shape of five fingers and a characteristic shape of a palm appear in the video image.

The gesture shape recognizing module is configured to recognize a gesture shape corresponding to the hand contour information from a preset gesture model database.

As an example, the gesture contour extracting module may store various gestures (e.g., finger splay, fist clenching, etc.) of the user into the gesture model database when the user uses the system for the first time. In that case, the gesture shape recognizing module can recognize a gesture shape corresponding to the hand contour information according to the gesture model database which stores the user's real gesture. Of course, the gesture model database may also store hand shape characteristics (e.g., the different state characteristics of the five fingers) in advance, and recognize corresponding gesture shape by detecting the state characteristic of each finger in the hand contour information.

The gesture shape synthesizing module is configured to synthesize gesture shapes recognized after each sampling of the respective channels of video stream data to obtain a gesture shape varying in real time.

In practical application, since each channel of video stream data uses part of the user's hand, and a complete hand cannot be obtained at the same timing, this embodiment adopts the gesture shape synthesizing module to perform a synthesis processing of the gesture shapes recognized after each sampling of the respective channels of video stream data, so as to obtain a gesture shape containing more information.

As described above, the gesture recognizing unit recognizes corresponding gesture shape according to gesture contour information in each channel of video stream data, and synthesizes the gestures recognized in the multiple channels of video stream data to obtain a gesture shape containing all the information of the user's hand, thereby enhancing the real effect of the gesture displayed in the 3D scene and improving the user's usage experience.

Preferably, the gesture analyzing unit in the preferred embodiment as illustrated in FIG. 1 comprises a position information obtaining module, a contact information obtaining module and a gesture motion obtaining module.

The position information obtaining module is configured to obtain relative spatial position information of the gesture shape varying in real time.

When a plurality of cameras shoot the user's gesture at the same timing, the light emitted from each camera forms an angle with the user's gesture, and when the user's gesture moves or varies, the angle formed by the light emitted from each camera and the user's gesture may be changed, while the changes of those angles are reflected as the changes of the spatial position in the video stream image data. Therefore, this technical solution obtains the relative spatial position information of the gesture shape varying in real time based on the objective fact.

Specifically, the present disclosure schematically illustrates two manners of obtaining the relative spatial position information of the gesture shape varying in real time, in which, the first manner of obtaining the relative spatial position information of the gesture shape is:

obtaining angle information with the gesture shape varied, from video image information of the at least two channels of video data streams acquired by the gesture acquiring unit; obtaining distance information of the user's gesture according to the angle information with the gesture shape varied; and obtaining the relative spatial position information of the user's gesture by combining the angle information with the gesture shape varied and the distance information of the user's gesture.

The second manner of obtaining the relative spatial position information of the gesture shape is:

obtaining angle information with the gesture shape varied, from video image information of the at least two channels of video data streams acquired by the gesture acquiring unit; sensing distance information of the user's gesture in real time through a distance sensor; and obtaining the relative spatial position information of the user's gesture by combining the angle information with the gesture shape varied and the distance information of the user's gesture.

Both the schemes improve the accuracy of the obtained relative spatial position information of the gesture shape by combining the angle information with the gesture shape varied and the real-time distance information of the user's gesture. In those, the first scheme obtains the relative spatial position information of the gesture shape merely through information provided by the video stream data, without additionally using any sensor, but an advanced algorithm is required and the system computation is more complex. The second scheme senses the distance variation of the gesture in real time through a distance sensor, and obtains the relative spatial position information of a high accuracy just in a simple algorithm. In practical application, an appropriate scheme may be selected according to the specific design requirement.

The contact information obtaining module is configured to obtain variation information of a determined contact on the gesture shape varying in real time, according to the contact on the gesture shape varying in real time, wherein the contact is a characteristic key point for identifying a hand.

To be noted, the contact in the module is a characteristic key point for identifying a hand, and the key point preferably is each articulation point of the hand, so as to better determine the gesture shape varying in real time. This technical solution does not particularly limit the number and the setting mode of the contacts on the gesture shape, which can be specifically designed in a design process by comprehensively considering the requirements of for example accuracy and data processing capacity of the system.

The gesture motion obtaining module is configured to obtain corresponding gesture motion from a preset motion database, according to the relative spatial position information and the variation information of the contact.

In order to describe the beneficial effects of the technical solution in more details, a virtual reality head-mounted device is taken as an example.

The virtual reality head-mounted device comprises a 3D display screen for displaying a 3D virtual reality scene, and the system for inputting a gesture in a 3D scene in the above technical solution, wherein the gesture acquiring unit of the system for inputting a gesture in a 3D scene consists of a front camera and a bottom camera provided on the virtual reality head-mounted device.

The working principle of the virtual reality head-mounted device is to obtain two channels of video stream data by acquiring the user's gesture in real time through the front camera and the bottom camera, recognize a gesture shape from the two channels of video stream data, obtain corresponding gesture motion by analyzing the gesture shape, process the gesture motion into a 3D image and display the 3D image in the 3D virtual reality scene in real time; at the same time, to send a gesture semantics corresponding to the gesture motion to a main processor of the virtual reality head-mounted device, and control the virtual reality head-mounted device to perform an operation of the gesture semantics.

Figure 2:
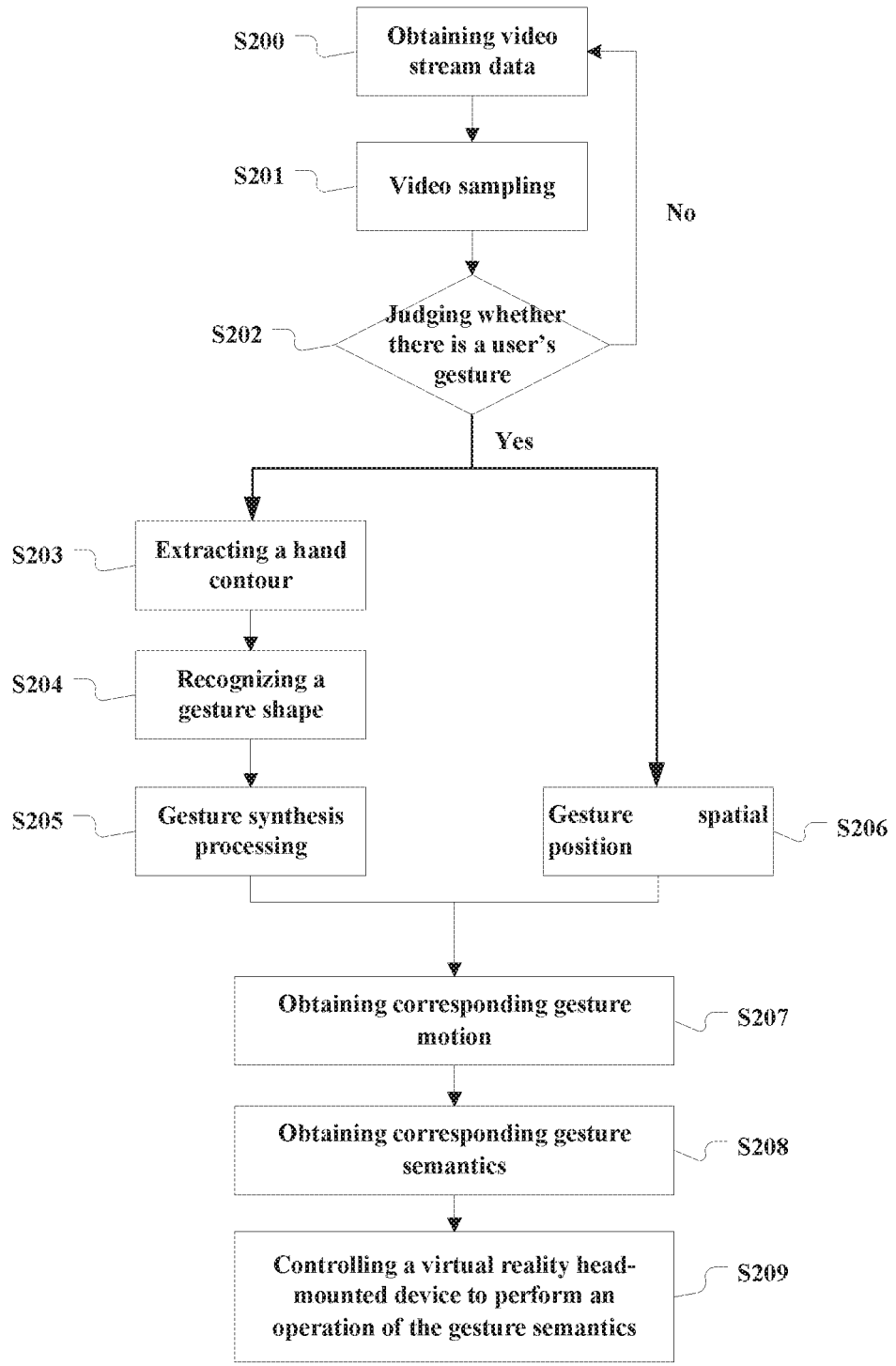
FIG. 2 is a flow diagram of a technology for operating a virtual reality head-mounted device with a gesture motion provided by an embodiment of the present disclosure.

In that, the technical procedure of obtaining the user's gesture motion according to the video stream data, and driving the virtual reality head-mounted device according to the gesture motion to perform corresponding operation is illustrated in FIG. 2:

S200: obtaining video stream data acquired by the front camera and the bottom camera;

S201: performing a video sampling processing of two channels of video stream data at a current timing, respectively, to obtain corresponding video image;

S202: judging whether a user's gesture exists in the video image; if so, turning to step S203; and if not, obtaining the video stream data at the next timing;

S203: performing a binarization processing of the video image data to extract hand contour information;

S204: recognizing a current gesture shape from the hand contour information according to a preset static gesture model;

S205: synthesizing gesture shapes recognized after the two channels of video stream data are sampled to obtain a gesture shape containing more hand information;

S206: obtaining spatial position variation information of the gesture;

S207: obtaining a gesture motion corresponding to the gesture shape varying in real time according to contact variation information of the gesture and spatial position variation information of the gesture using a Hidden Markov Model (HMM) dynamic gesture recognizing method;

S208: obtaining corresponding gesture semantics in a preset semantic database according to the gesture motion;

S209: controlling the virtual reality head-mounted device to perform an operation of the gesture semantics.

This embodiment applies a system for inputting a gesture in a 3D scene into a virtual reality head-mounted device, and takes the user's hand motion as an input of the virtual reality head-mounted device, so that the user completes relevant operation in the virtual reality scene through his hand, thereby improving the user's experience and optimizing the man-machine interaction.

Figure 3:
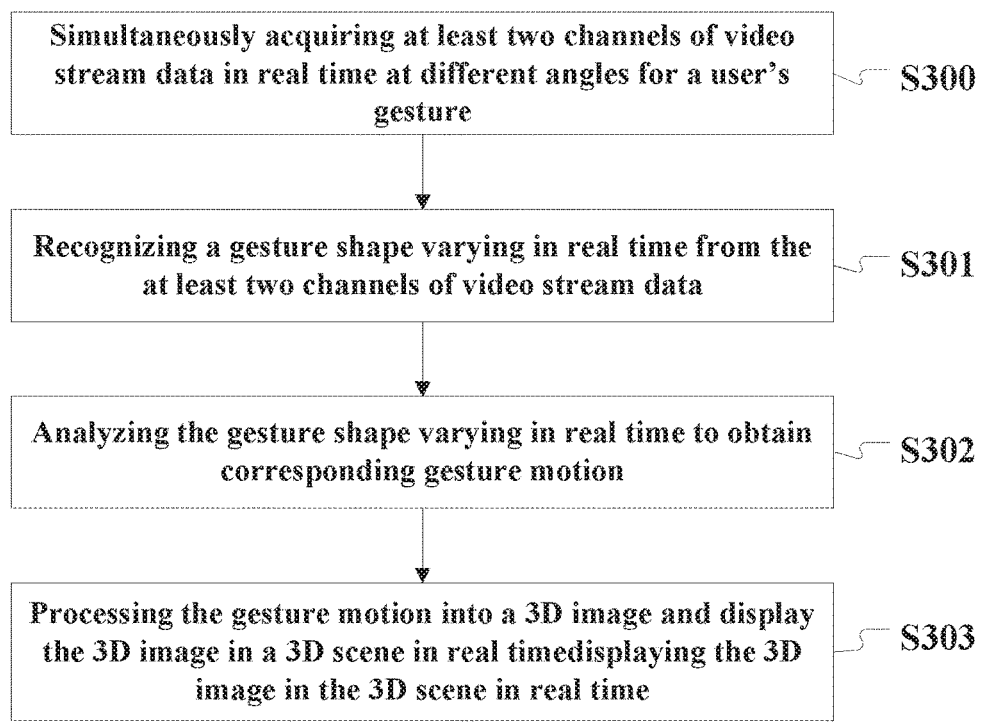
FIG. 3 is a flow diagram of a method for inputting a gesture in a 3D scene provided by an embodiment of the present disclosure.

FIG. 3 is a flow diagram of a method for inputting a gesture in a 3D scene provided by an embodiment of the present disclosure. The method comprises:

S300: simultaneously acquiring at least two channels of video stream data in real time at different angles for a user's gesture.

S301: recognizing a gesture shape varying in real time from the at least two channels of video stream data.

Specifically, performing a sampling processing of each of the at least two channels of video stream data to obtain video image data sampled each time;

judging whether the video image data contain hand information, and if so, performing a binarization processing of the video image data to extract hand contour information;

recognizing a gesture shape corresponding to the hand contour information from a preset gesture model database; and synthesizing gesture shapes recognized after each sampling of the respective channels of video stream data to obtain a gesture shape varying in real time.

S302: analyzing the gesture shape varying in real time to obtain corresponding gesture motion.

Specifically, obtaining relative spatial position information of the gesture shape varying in real time;

obtaining variation information of a determined contact on the gesture shape varying in real time, according to the contact on the gesture shape varying in real time, wherein the contact is a characteristic key point for identifying a hand;

obtaining corresponding gesture motion from a preset motion database, according to the relative spatial position information and the variation information of the contact.

In that, the obtaining relative spatial position information of the gesture shape varying in real time comprises:

obtaining angle information with the gesture shape varied, from video image information of the at least two channels of video data streams;

obtaining distance information of the user's gesture according to the angle information with the gesture shape varied, or sensing distance information of the user's gesture in real time through a distance sensor;

obtaining the relative spatial position information of the user's gesture according to the angle information with the gesture shape varied and the distance information of the user's gesture.

S303: processing the gesture motion into a 3D image and displaying the 3D image in the 3D scene in real time.

Preferably, the method further comprises:

obtaining, from a preset semantic database, a gesture semantics of the gesture motion and an operation instruction corresponding to the gesture semantics;

sending the operation instruction corresponding to the gesture semantics to the 3D scene, so that the 3D scene performs an operation of the gesture semantics.

In conclusion, the embodiments of the present disclosure disclose a system and method for inputting a gesture in a 3D scene. In the system, the gesture acquiring unit acquires at least two channels of video stream data in real time for a user's gesture; the gesture recognizing unit recognizes a gesture shape having complete hand information from the at least two channels of video stream data; the gesture analyzing unit analyzes the gesture shape to obtain corresponding gesture motion; and the gesture displaying unit processes the gesture motion into a 3D image and display the 3D image in the 3D scene in real time, thereby achieving the purpose of displaying the user's real gesture in the 3D scene. In addition, a preferred technical solution of the present disclosure further processes the gesture motion by the gesture operating unit to generate corresponding gesture semantics, so that the 3D scene performs an operation corresponding to the gesture semantics, thereby achieving the purpose of controlling the 3D scene through the input gesture. As compared with the prior art, the technical solution interacts with the virtual reality device without a keyboard or a mouse, and the interaction process does not need to make too much constraint to the user and the use environment, i.e., the user does not need to wear any recognition mark or sensor on his body, thereby realizing the interaction between the user and the 3D scene through the user's real gesture, and improving the user's usage experience.

The above descriptions are just preferred embodiments of the present disclosure, rather than limitations to the protection scope of the present disclosure. Any amendment, equivalent replacement, improvement, etc. made within the spirit and principle of the present disclosure shall fall within the protection scope of the present disclosure.

The invention claimed is:

1. A system for inputting a gesture in a 3D scene, comprising:
   a gesture acquiring unit, comprising at least two cameras, configured to simultaneously acquire at least two channels of video stream data in real time at different angles for a user's gesture, wherein each channel of the video stream data acquires a first part and a second part of a user's hand, wherein the first part is different from the second part;
   a memory storing an instruction; and
   at least one processor;
   wherein the at least one processor executes the following operations according to the instruction stored at the memory:
   recognizing a gesture shape varying in real time from the at least two channels of video stream data;
   analyzing the gesture shape varying in real time to obtain corresponding gesture motion; and
   processing the gesture motion into a 3D image and display the 3D image in the 3D scene in real time; and
   obtaining, from a preset semantic database, a gesture semantics of the gesture motion and an operation instruction corresponding to the gesture semantics; and send the operation instruction corresponding to the gesture semantics to the 3D scene, so that the 3D scene performs an operation of the gesture semantics,
   wherein in the process of recognizing a gesture shape varying in real time from the at least two channels of video stream data, the processor executes the following operations:
   performing a sampling processing of each of the at least two channels of video stream data to obtain video image data sampled each time;
   judging whether the video image data contain hand information, and if so, perform a binarization processing of the video image data to extract hand contour information;
   recognizing a gesture shape corresponding to the hand contour information from a preset gesture model database; and
   synthesizing gesture shapes recognized after each sampling of the respective channels of video stream data to obtain a gesture shape varying in real time.

2. The system according to claim 1, wherein in the process of analyzing the gesture shape varying in real time to obtain corresponding gesture motion, the processor executes the following operations:
   obtaining relative spatial position information of the gesture shape varying in real time;
   a contact information obtaining module configured to obtain variation information of a determined contact on the gesture shape varying in real time, according to the contact on the gesture shape varying in real time, wherein the contact is a characteristic key point for identifying a hand; and
   obtaining corresponding gesture motion from a preset motion database, according to the relative spatial position information and the variation information of the contact.

3. The system according to claim 2, wherein in the process of obtaining relative spatial position information of the gesture shape varying in real time, the processor executes the following operations:
   obtaining angle information with the gesture shape varied, from video image information of the at least two channels of video data streams;
   obtaining distance information of the user's gesture according to the angle information with the gesture shape varied, or sense distance information of the user's gesture in real time through a distance sensor; and
   obtaining the relative spatial position information of the user's gesture according to the angle information with the gesture shape varied and the distance information of the user's gesture.

4. A method for inputting a gesture in a 3D scene, comprising:
   simultaneously acquiring at least two channels of video stream data in real time at different angles for a user's gesture, wherein each channel of the video stream data acquires a first part and a second part of a user's hand, wherein the first part is different from the second part;
   recognizing a gesture shape varying in real time from the at least two channels of video stream data;
   analyzing the gesture shape varying in real time to obtain corresponding gesture motion; and
   processing the gesture motion into a 3D image and displaying the 3D image in the 3D scene in real time;
   obtaining, from a preset semantic database, a gesture semantics of the gesture motion and an operation instruction corresponding to the gesture semantics; and sending the operation instruction corresponding to the gesture semantics to the 3D scene, so that the 3D scene performs an operation of the gesture semantics,
   wherein the recognizing a gesture shape varying in real time from the at least two channels of video stream data comprises:

performing a sampling processing of each of the at least two channels of video stream data to obtain video image data sampled each time;

judging whether the video image data contain hand information, and if so, performing a binarization processing of the video image data to extract hand contour information;

recognizing a gesture shape corresponding to the hand contour information from a preset gesture model database; and synthesizing gesture shapes recognized after each sampling of the respective channels of video stream data to obtain a gesture shape varying in real time.

5. The method according to claim 4, wherein the analyzing the gesture shape varying in real time to obtain corresponding gesture motion comprises:

obtaining relative spatial position information of the gesture shape varying in real time;

obtaining variation information of a determined contact on the gesture shape varying in real time, according to the contact on the gesture shape varying in real time, wherein the contact is a characteristic key point for identifying a hand; and obtaining corresponding gesture motion from a preset motion database, according to the relative spatial position information and the variation information of the contact.

6. The method according to claim 5, wherein the obtaining relative spatial position information of the gesture shape varying in real time comprises:

obtaining angle information with the gesture shape varied, from video image information of the at least two channels of video data streams;

obtaining distance information of the user's gesture according to the angle information with the gesture shape varied, or sensing distance information of the user's gesture in real time through a distance sensor; and obtaining the relative spatial position information of the user's gesture according to the angle information with the gesture shape varied and the distance information of the user's gesture.

* * * * *